United States Patent [19]

Limaye et al.

[11] 3,915,970

[45] Oct. 28, 1975

[54] HEXAHYDRO-1,3,5-TRIAZINES

[75] Inventors: Shrikant Hari Limaye; Donald Griffith Jones; Frederick Roland Moore, all of Chesterfield, England

[73] Assignee: Coalite and Chemical Products Limited, Chesterfield, England

[22] Filed: Mar. 22, 1973

[21] Appl. No.: 343,989

[30] Foreign Application Priority Data

Mar. 24, 1972 United Kingdom............... 13894/72

[52] U.S. Cl................ 260/248 NS; 424/249; 44/63; 44/51; 252/51.5 R
[51] Int. Cl.²...................................... C07D 251/04
[58] Field of Search............................... 260/248 NS

[56] References Cited
UNITED STATES PATENTS

| | | | |
|---|---|---|---|
| 2,675,382 | 4/1954 | Melamed | 260/248 X |
| 2,889,277 | 6/1959 | Hughes | 260/248 X |
| 3,000,889 | 9/1961 | Frankel | 260/248 |
| 3,041,337 | 6/1962 | Frankel | 260/248 |
| 3,065,232 | 11/1962 | George | 260/248 |
| 3,108,101 | 10/1963 | George et al. | 260/248 |
| 3,317,603 | 5/1967 | Blance et al. | 260/248 X |
| 3,505,057 | 4/1970 | Luckenbaugh | 260/248 X |
| 3,694,440 | 9/1972 | Knell | 260/248 |
| 3,705,155 | 12/1972 | Miller | 260/248 |
| 3,761,473 | 9/1973 | Tesoro et al. | 260/248 |

*Primary Examiner*—John M. Ford
*Attorney, Agent, or Firm*—Woodhams, Blanchard and Flynn

[57] ABSTRACT

A condensation product of an aldehyde, particularly formaldehyde which may be generated in situ, and an ether-amine of the formula $HOC_mH_{2m}[OC_nH_{2n}]_pNH_2$ where $m$, $n$ and $p$ are integers, particularly 2-(2'-hydroxyethoxy)ethylamine, is a biocide which is particularly effective against the microbes which attack hydrocarbon fractions, for example jet fuel, in the presence of water, the amount of which water may be very small. The biocide is especially useful as an additive in cutting or soluble oil emulsions to mitigate their degradation by micro-organisms.

4 Claims, No Drawings

HEXAHYDRO-1,3,5-TRIAZINES

The invention relates to a biocide or disinfectant, to a method of producing the biocide and to a composition comprising the biocide.

It is known that various liquid compositions used in industry and comprising organic components, for example hydrocarbon fractions such as jet fuel, fuel oil and other petroleum fractions, and cutting oils, are subject to attack by microorganisms in the presence of water. The amount of water which is present may be very small indeed.

Thus, oils and oil emulsions used in the engineering industry as lubricants and coolants are, after use, invariably found to be contaminated by micro-organisms. The degree and speed of build-up of contamination is so high that a fresh emulsion shows, after 5 to 6 days' use, hundreds of thousands or even millions of organisms per ml. of the emulsion. These organisms in turn change the chemical as well as the physical properties of the oil emulsion.

At the beginning of degradation of the oil emulsion by the micro-organisms, oil droplets of approximately 1 micron size and which are evenly dispersed in the emulsion begin to increase in diameter up to 10 – 12 microns and, after a while, free oil separates out and can be observed as a separate layer of oil on the surface of the oil emulsion. The emulsion is at times discoloured and it frequently generates a bad odour.

The degradation of the emulsion ultimately results in:
1. loss in the lubricating film;
2. loss in the anticorrosive properties of the emulsion;
3. fall in the pH of the emulsion;
4. reduction in the useful life of the oil emulsion;
5. accumulation of slime and sediment;
6. impairment of the finish of the metal being machined;

and 7. loss in the useful properties of the oil emulsion due to degradation of additives which give the tool bite and degradation of emulsifiers.

These and other undesirable changes are brought about by the activity of micro-organisms in oils and oil emulsions, though in straight oils, or in insoluble oils, the rate of degradation is slower. This microbial attack compels the user to discard the contaminated cutting oil or emulsions and to recharge with fresh cutting oil or emulsion. This involves not only a financial loss but also slows down the production rate.

It is an object of the invention to provide a biocide which when included in small quantities in such oil emulsions, will mitigate degradation of the emulsion by micro-organisms without any substantial deleterious effect upon other properties of the oil emulsion.

According to the invention there is provided a condensation product of an aldehyde and an ether-amine of the formula $$HOC_mH_{2m}[OC_nH_{2n}]_pNH_2$$

in which m, n and p are integers. Advantageously, m, n and p each denote integers from 1 to 6. It will be understood that when either of m and n is greater than 1, the corresponding group $C_mH_{2m}$ or $C_nH_{2n}$ may be a straight or branched chain.

The condensation reaction mixture may also include a primary alkylamine which preferably does not contain more than four carbon atoms in the molecule and-/or a primary cycloalkylamine, particularly cyclopentylamine or cyclohexylamine, the ether-amine and the alkylamine and/or cycloalkylamine being present in such amounts that the condensation reaction product contains residues derived from the ether-amine and from the alkylamine or cycloalkylamine. A preferred alkylamine is ethylamine and the preferred cycloalkylamine is cyclohexylamine.

Preferred ether-amines include 2-(2'-hydroxyethoxy) ethylamine $$HO\ CH_2\ CH_2\ O\ CH_2\ CH_2\ NH_2$$

Other suitable ether-amines include 2-(3'-hydroxypropoxy)ethylamine, 2-(1'-methyl-2'-hydroxyethoxy)ethylamine, 3-(2'-hydroxyethoxy) propylamine, 3-(3'-hydroxypropoxy)propylamine, 2-(4'-hydroxybutoxy)ethylamine and 3-(2'-hydroxyethoxy)-1-methylpropylamine.

The aldehyde precursor of the condensation product is advantageously an aliphatic aldehyde, for example an aliphatic aldehyde containing not more than four carbon atoms in the molecule. The preferred aldehyde is formaldehyde and it may be generated in the reaction mixture from, for example, paraformaldehyde.

The condensation reaction is readily carried out at a slightly elevated temperature, conveniently at a temperature in the range 40° – 60°C. Suitably the amine or mixture of amines, neat or in aqueous solution, is condensed with paraformaldehyde whilst maintaining the temperature below 60°C, the water of reaction together with any used as solvent being then removed, for example as an azeotrope with a suitable, added azeotrope-former such as toluene. The aldehyde and amine (or amine mixture) are preferably used in substantially equimolar amounts, for example from 0.8 to 1.2 moles of amine or amine mixture per mole of aldehyde.

The invention also includes a biocide which is a substituted hexahydro-1,3,5-triazine of the formula

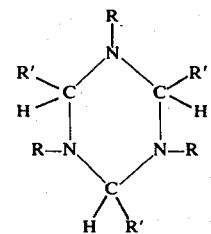

in which R' is hydrogen or an alkyl group, at least one of the R groups has the formula $$HOC_mH_{2m}[OC_nH_{2n}]_p—$$

in which m, n and p are as hereinbefore defined, and the two other R groups are groups of the same general formula or are alkyl or cycloalkyl groups. When one or two of the groups R are alkyl groups and one or more of the R' groups are alkyl groups, each such group advantageously contains not more than four carbon atoms.

In the preferred triazines, each R' is hydrogen. A particularly preferred triazine is 1,3,5-tris(2'-hydroxyethoxyethyl)-hexahydro-1,3,5-triazine. Other suitable triazines include those in which one or two of the hydroxyethoxyethyl groups are replaced by $C_1 – C_4$ alkyl groups and/or cycloalkyl, specifically cycohexyl or cyclopentyl, groups and/or by other hydroxyalkoxyalkyl groups as well as those in which the three hydroxyethoxyethyl groups are replaced by other hydroxyalkoxyalkyl groups. Such other hydroxyalkoxyalkyl groups are suitably those derived from the ether-amines hereinbefore specifically named.

Examples of such other suitable triazines include 1-ethyl - 3,5 -bis(2'-hydroxyethoxyethyl)-, 1-n-butyl - 3,5 -bis(2'-hydroxyethoxyethyl)-, 1-cyclohexyl - 3,5 - bis(-2'- hydroxyethoxyethyl)-, 1-methyl - 3,5 - bis(2'-hydroxypropoxyethyl)-, 1 - isopropyl - 3,5 - bis(2'-hydroxypropoxyethyl)-, 1 - ethyl - 3,5 - bis(1'-methyl - 2' - hydroxyethoxyethyl)-, 1 - cyclohexyl - 3,5 - bis[3' - (2'' - hydroxyethoxy)propyl] -, 1 - ethyl - 3,5 - bis [2' - (4'' - hydroxybutoxy)ethyl] -, 1 - propyl - 3,5 - bis [3' - (3'' - hydroxypropoxy)propyl] -, 1 - ethyl - 3,5 - bis [3' - (2'' - hydroxyethoxy) - 1' - methylpropyl] -, 1,3 - diethyl - 5 - (2' - hydroxyethoxyethyl)-, 1,3 - dicyclohexyl - 5 - (2' - hydroxyethoxyethyl)-, 1 - ethyl - 3 - cyclohexyl - 5 - (2' - hydroxyethoxyethyl)-, 1,3 diisopropyl - 5 -(2'-hydroxyethoxyethyl)',1,3 - diethyl - 5 - [2'-(3''-hydroxypropoxy)ethyl] -, and 1 - ethyl - 3 - propyl - 5 [2'-hydroxyethoxyethyl] 1 - ethyl - 3 - (2'-hydroxyethoxyethyl)- 5 - (2'-hydroxypropoxyethyl)-, 1 - cyclohexyl - 3 - (2'-hydroxyethoxyethyl) - 5 - (2'- hydroxypropoxyethyl)-, 1 - propyl - 3 - [3'-(2''-hydroxyethoxy)propyl] - 5 - (2'-hydroxyethoxyethyl)- and 1 - ethyl - 3 - (2' - hydroxyethoxyethyl) - 5 - [3'- (3''-hydroxypropoxy) propyl]- hexahydro - 1,3,5 - triazines.

It will be appreciated that the triazines are or form part of the condensation products or members of the group of condensation products hereinbefore described and constituting part of the invention. The triazines may be obtained by the condensation of the appropriate aldehyde and amine or amine mixture in the manner hereinbefore described.

The invention also includes a liquid composition containing the biocide, that is, the condensation product or the triazine.

The liquid composition may be a hydrocarbon fraction, for example a jet fuel, containing 0.001 – 2% v/v, preferably 0.01 – 0.5% v/v, of the biocide.

A further liquid composition according to the invention comprises water, a surfactant for example, a detergent, emulsifier or wetting agent, and the biocide.

Another and preferred liquid composition according to the invention is a cutting oil or oil emulsion comprising the biocide. When the oil emulsion is in a form ready for use on a lathe or other metal-working machine, the concentration of the biocide is suitably from 0.01 – 2% v/v, preferably 0.05 – 1% v/v. When the cutting or soluble oil is in the form of a concentrate, it will be understood that the concentration of the biocide is correspondingly higher, for example from 1 – 10% v/v.

The invention is illustrated in the following example.

EXAMPLE

Paraformaldehyde (30g) was slowly added to 2-(2'-hydroxyethoxy)ethylamine (105g) whilst stirring and maintaining the temperature at below 60°C. When addition of the amine was complete, the mixture was maintained at 60°C for some time to complete the reaction. The product was then filtered to give a water-white viscous fluid. This material was used in the biocide tests hereinafter given. In another run, the product was dried by azeotroping it with 3 – 4 times its volume of toluene. The toluene was distilled off under reduced pressure and the anhydrous product was distilled, boiling at 90° – 92°C at 1mm mercury.

Contaminated cutting oil emulsions were examined micro-biologically, and the variety of micro-organisms found included different strains of Pseudomonas, yeasts, moulds, Nocardia and anaerobes such as Clostridium and Desulphovibrio.

The main aerobic bacteria found were Pseudomonas. The specific contaminants were isolated in the laboratory from contaminated oils and oil emulsions and were grown on specific media and in turn were used to artificially contaminate fresh oil emulsions. 1 ml of this artificially contaminated sample was mixed with 8 ml of sterile distilled water + 1 ml of 1% Corexit in a sterile test tube to make the initial dilution 1 : 10. Serial dilutions were made and a count of the number of organisms per ml was made using conventional bacteriological techniques. The biocide produced in the Example was added at 0.05%, 0.1% 0.2% concentrations in three different cutting oil emulsions, namely Prosol 67, Dromus oil B and Dromus Fluid H, and incubated at 30°C. The biocide-containing cutting oil emulsions were sampled out after 24 hours, 48 hours, 120 hours, 7 days, 14 days and 35 days to estimate the number of survivors. Visible physical changes, if any, such as discolouration, breakdown of emulsion, sedimentation, accumulation of oil droplets on the surface were also noted.

The biological results are shown in the following table. Experiment 1 was carried out with Prosol 67 (5% emulsion concentration), Experiment 2 with Dromus oil B and Experiment 3 with Dromus Fluid H. Experiments 4 and 5 were also carried out with Prosol 67 (5% emulsion strength) but on a circulating machine simulating, as far as possible, shop floor conditions.

| Expt. | Conc. | Day 0 | Day 1 | Colony count per ml. Day 2 | Day 5 | Day 7 | Day 14 | Day 35 |
|---|---|---|---|---|---|---|---|---|
| 1 | 0.05% | $1.48 \times 10^8$ | $1 \times 10^6$ | 200 | 100 | 100 | 100 | — |
|   | 0.1% | $1.08 \times 10^8$ | 100 | 100 | 100 | 100 | 100 | — |
| 2 | 0.1% | $6 \times 10^5$ | 100 | N.T. | N.T. | 100 | 100 | — |
| 3 | 0.1% | $8 \times 10^6$ | 100 | N.T. | N.T. | 100 | 100 | — |
| 4 | 0.1% | $6.1 \times 10^7$ | 100 | N.T. | N.T. | N.T. | 100 | 100 |
| 5 | 0.2% | $6.1 \times 10^7$ | — | — | — | — | — | — |

Conc. denotes the biocide concentration, v/v, in the oil emulsion. The column headed "Day 0" gives the colony count of the initial inoculum. N.T. Means "not tested". The dash indicates complete kill.

No undesirable physical change was observed in the biocide-containing oil emulsion. The Herbert corrosion test indicated that the anti-corrosive properties of the emulsion were also improved by the presence of the biocide. It will be noted from the table that in each case more than 99% kill was shown in 24 hours.

We claim:

1. A compound having the formula

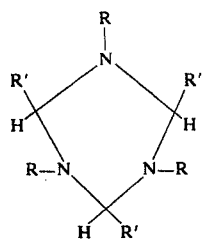

wherein

R' is hydrogen or alkyl having one to four carbon atoms, and R is $HOC_mH_{2m}(OC_nH_{2n})_p$, alkyl having one to four carbon atoms, cyclohexyl or cyclopentyl, with the proviso that at least one R is $HOC_mH_{2m}(OC_nH_{2n})_p$ wherein $m$, $n$ and $p$ are integers from 1 to 6.

2. A compound according to claim 1 in which each R' is hydrogen.

3. A compound according to claim 1 in which each R is $HOC_mH_{2m}(OC_nH_{2n})_p$.

4. 1,3,5-tris(2'-hydroxyethoxyethyl)-hexahydro-1,3,5-triazine.

* * * * *